United States Patent
Franceschini et al.

(10) Patent No.: US 9,218,296 B2
(45) Date of Patent: Dec. 22, 2015

(54) LOW-LATENCY, LOW-OVERHEAD HYBRID ENCRYPTION SCHEME

(71) Applicant: International Business Machines Corporation, Armonk, NY (US)

(72) Inventors: Michele M. Franceschini, White Plains, NY (US); Ashish Jagmohan, Irvington, NY (US); Luis A. Lastras-Montano, Cortlandt Manor, NY (US); Moinuddin K. A. Qureshi, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 14/164,325

(22) Filed: Jan. 27, 2014

(65) Prior Publication Data

US 2015/0212951 A1    Jul. 30, 2015

(51) Int. Cl.
*G06F 21/62* (2013.01)
*G06F 12/14* (2006.01)

(52) U.S. Cl.
CPC .................................. *G06F 12/1408* (2013.01)

(58) Field of Classification Search
CPC ................ G06F 12/1408; G06F 21/60; G06F 2221/2107; G06F 2212/402; H04L 9/006
See application file for complete search history.

(56) References Cited

U.S. PATENT DOCUMENTS

| | | | |
|---|---|---|---|
| 6,598,161 | B1 | 7/2003 | Kluttz et al. |
| 7,522,725 | B2 | 4/2009 | Graunke |
| 7,870,385 | B2 | 1/2011 | Risan et al. |
| 7,987,361 | B2 | 7/2011 | Han et al. |
| 2007/0033399 | A1 | 2/2007 | Takeda |
| 2010/0146303 | A1* | 6/2010 | Kothari et al. ................. 713/193 |
| 2013/0036312 | A1* | 2/2013 | Anquet et al. ................. 713/189 |
| 2013/0205139 | A1* | 8/2013 | Walrath ........................ 713/190 |

* cited by examiner

*Primary Examiner* — Izunna Okeke
(74) *Attorney, Agent, or Firm* — Cantor Colburn LLP (57) ABSTRACT

A hybrid encryption scheme for storing data lines in a memory includes identifying data lines determined to be frequently accessed, and encrypting the data lines using a first encryption scheme. The hybrid encryption scheme also includes encrypting data lines determined not to be frequently accessed using a second encryption scheme.

19 Claims, 6 Drawing Sheets

LOW-LATENCY, LOW-OVERHEAD HYBRID ENCRYPTION SCHEME

BACKGROUND

The present disclosure relates generally to data encryption, and more particularly, to a low-latency, low-overhead hybrid encryption scheme.

Encryption is a commonly used scheme to secure data against unauthorized access. In an encryption scheme, information referred to as plain text is transformed using an encryption algorithm into unreadable cipher text. The process of encoding messages or information provides protection from hackers, unauthorized users and other eavesdroppers who no longer can read the original text. Authorized users and parties, however, can still be able to access and retrieve the information. While unauthorized individuals are unable to determine any part of the intercepted cipher text, authorized users will be able to access the information in its original format by using a corresponding algorithm to decrypt the cipher text.

Encryption is used to protect existing data in memory, as well as information in data files and other sources. Encryption can enhance protection in environments where securing data is physically difficult due to points of access to all networks. In addition, encrypting data is also used to protect data that is in transit, such as data being transferred via networks. This transient data may be submitted through the Internet and within a cloud computing environment using various computer systems, both wireline and wireless. As the technological savvy of hackers and related tools become more advanced, so is the need to create more advanced countermeasures to protect data.

SUMMARY

Embodiments include methods, a system, and a computer program product for encrypting and decrypting data using a hybrid data encryption/decryption scheme. The method of encrypting a first memory in a computer system having data lines includes identifying data lines determined to be frequently accessed, and encrypting the data lines determined to be frequently accessed using a first encryption scheme. The method also includes encrypting data lines determined not to be frequently accessed using a second encryption scheme.

The method of decrypting stored data includes upon receiving data, searching in a first memory for a match between the data and information previously stored in the first memory to decrypt the data, and decrypting the data using a first encryption scheme upon determining the match between the data and the information in response to the searching in the first memory. The method also includes searching in a second memory upon determination that there is no match between the data and the information in response to the searching in the first memory, and using a second decryption scheme when the data corresponds to an entry using the second memory.

Additional features and advantages are realized through the schemes of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
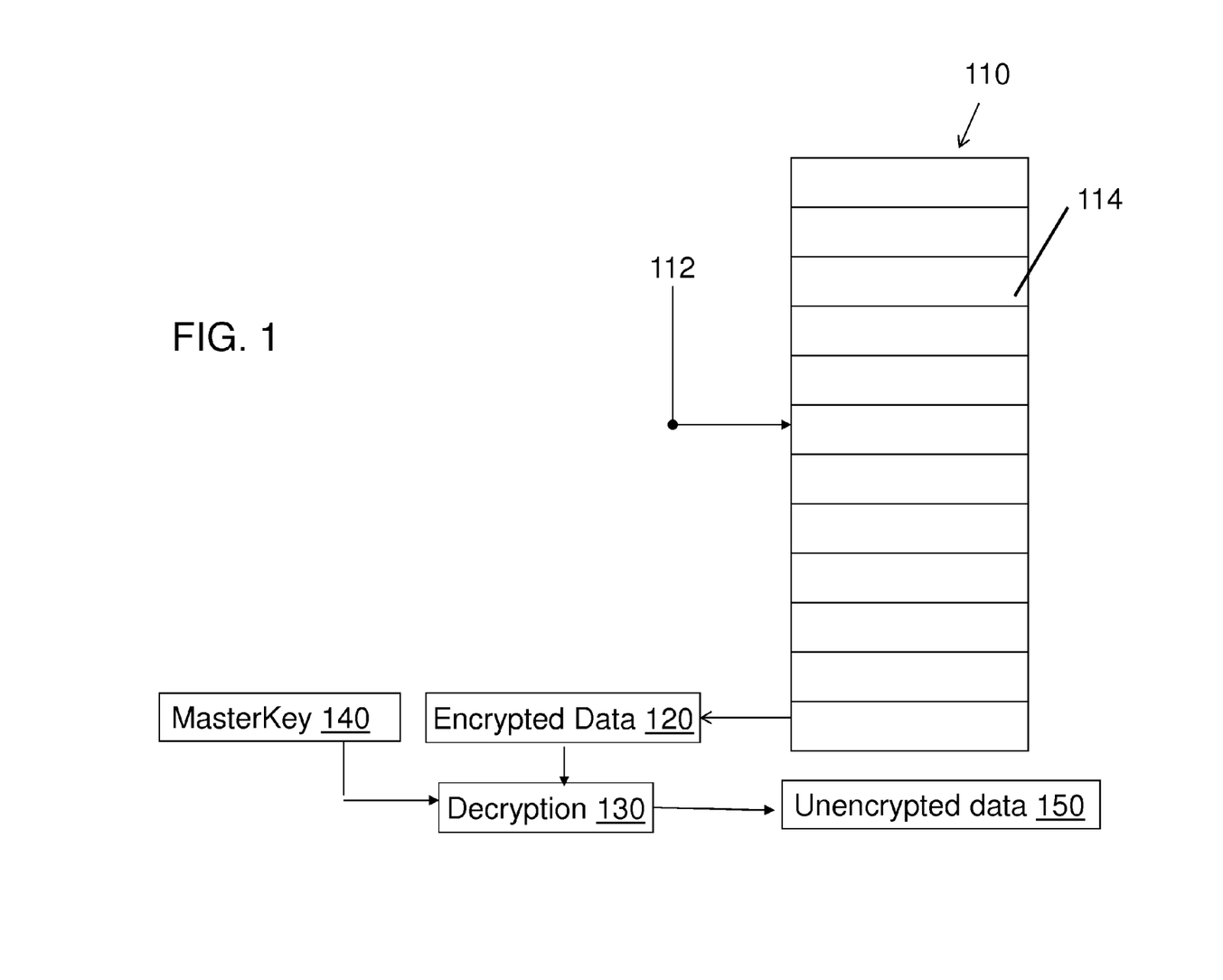
FIG. 1 depicts a block diagram illustrating a low storage encryption scheme (LSE) in accordance with an embodiment.

FIG. 1 is a block diagram illustration of one embodiment of an encryption scheme. In FIG. 1 a low storage encryption (LSE) scheme is depicted having a memory 110 with a plurality of addresses 112 and memory lines 114 (also referred to herein as "data lines"). Data is retrieved from the memory 110 by requestors that can include processors, other memories, computers, and similar other electronic devices as can be appreciated by those skilled in the art. Data is encrypted as shown at 120 before it is provided to the requestor. In this way, an unauthorized party is not able to access information that is being retrieved. An authorized party, however, is able to decode the information using a decryption algorithm as shown at 130. A decryption algorithm, in one embodiment, requires a decryption key (MasterKey) 140 that only authorized users are provided, and which yields the unencrypted data 150. In one embodiment, an encryption scheme usually needs a key-generation algorithm that produces a variety of keys randomly or according to a certain scheme.

There are many encryption schemes, but most often these schemes fall into two categories. A first category includes a symmetric-key encryption and a second category includes a public-key encryption. In symmetric-key schemes, the encryption and decryption keys are the same. Thus, communicating parties must agree on a particular or selective key scheme prior to communicating. By contrast, in public-key schemes, the encryption key is public and anyone with access to the encryption key can encrypt messages. However, only the receiving party will be provided access to the decryption key and thus is the only one capable of reading the encrypted messages.

Figure 2:
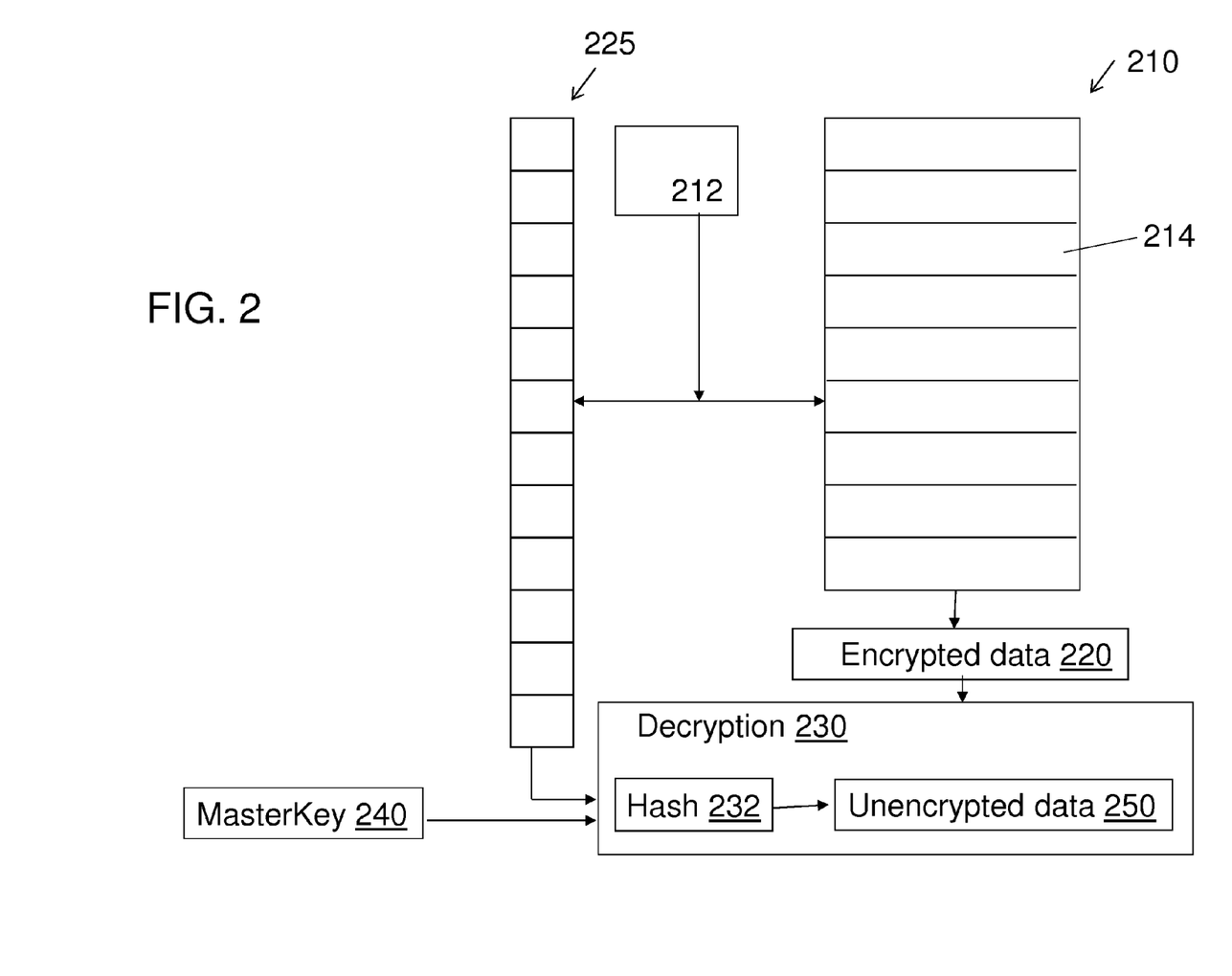
FIG. 2 depicts a block diagram illustrating a low latency encryption (LLE) scheme in accordance with an embodiment.

There are many metrics that have to be considered in using an encryption scheme. Such metrics may include, cost, storage capacity, processing time required by encryption-implemented hardware (e.g., hardware that performs cryptography and other similar functions). FIG. 1 provides a low storage scheme. By contrast, the example in FIG. 2 provides a cost effective low-latency encryption (LLE). In FIG. 2, the LSE scheme is depicted having a memory 210 with a plurality of addresses 212 and memory lines 214 (also referred to herein as "data lines"). As shown in FIG. 2, the memory 210 is enabled to retrieve and access metadata 225. As before, upon receipt of a requestor command for data retrieval, data from memory 210 is retrieved and encrypted for subsequent sending. In this embodiment, a master key 240 is used to decrypt 230 (e.g., through a hash function 232) the encrypted data 220 and further mask encrypted data 220 for added security. The decryption 230 yields the unencrypted data 250.

Memory encryption schemes are increasing in importance for a variety of reasons, such as the emergence of the cloud computing model in which organizations entrust a cloud system manager with their workloads and data. Additionally, the likely adoption of storage class memory (SCM) technology in memory systems implies a potential exposure of customer data that is stored persistently on SCM memory components and that could be physically stolen from a system. However, present encryption standards are expensive to implement, resulting in undesirable memory latency increases, chip power consumption and associated chip area costs. To further exacerbate the problem, the high bandwidth characteristics of memory systems, where individual memory channels can reach tens of gigabytes/second, imply the need for multiple parallel encryption engines.

Encryption processes incur even more latency overhead in some advanced encryption algorithms such as the Advanced Encryption Standard (AES). AES is a specification for the encryption of electronic data established by the U.S. National Institute of Standards and Technology (NIST) and was originally called Rijndael. AES supersedes the Data Encryption Standard (DES), and is being used commercially. The algorithm described by AES is a symmetric-key algorithm, meaning the same key is used for both encrypting and decrypting the data. Latency overhead is large in AES because of its serial nature. This is because data values are used to process a stage, and then the output of this stage is used as the input of another stage. This latency overhead, unfortunately, can lower the performance of high-performance memory systems.

The latency overhead of encryption can be reduced by parallelizing the process of generating an ex-or mask while accessing the memory line as is illustrated in FIG. 2. In order to ensure robustness, however, such a scheme would require that the key is not shared globally across the whole memory space and is refreshed periodically. This can be obtained by having a simple counter with every memory line (or group of lines), and periodically updating the counter after a given number of accesses. While this scheme has low latency, it has the disadvantage of incurring high storage overhead.

Referring back to FIG. 1, the LSE depicted in that scheme has a serialized encryption scheme. By contrast, the LLE scheme of FIG. 2 has low latency but a higher storage overhead. Ideally, an encryption scheme that has the latency of LLE and storage overhead of LSE is desired and will be provided in one embodiment. As shown in the two Figures, LSE only requires as much storage as is in the memory as it uses the actual memory input to provide the encryption itself. The problem with this type of encryption is that if the particular line of memory can be hacked, then the encryption may be easily achievable. The LLE by contrast requires a much higher overhead in that each line has some metadata associated with it that needs to be stored and is being used to provide the encryption of the memory lines. The metadata could be a per-address independent vector (IV) or a counter. Therefore, in this embodiment, additional storage for the metadata needs to be provided.

Consequently, the latency of the implementation associated with different encryption schemes provide trade-offs with other metrics such as circuit area, time-area product, power, and energy consumption also playing an important role. It is not always easy to select an encryption scheme as many of the tradeoffs are difficult to negotiate. In one embodiment, as will be discussed in FIGS. 3-5, a new secured memory system is architected that combines different encryption schemes in order to provide optimized benefits. In this embodiment, the problem of selecting between the tradeoffs presented between latency of decryption operations and the implementation cost of the encryption/decryption mechanisms (such as through the design of some of the components discussed above) is resolved by providing an architecture that takes advantage of the benefits of both schemes while minimizing the overall shortcomings of either scheme.

Figure 3:
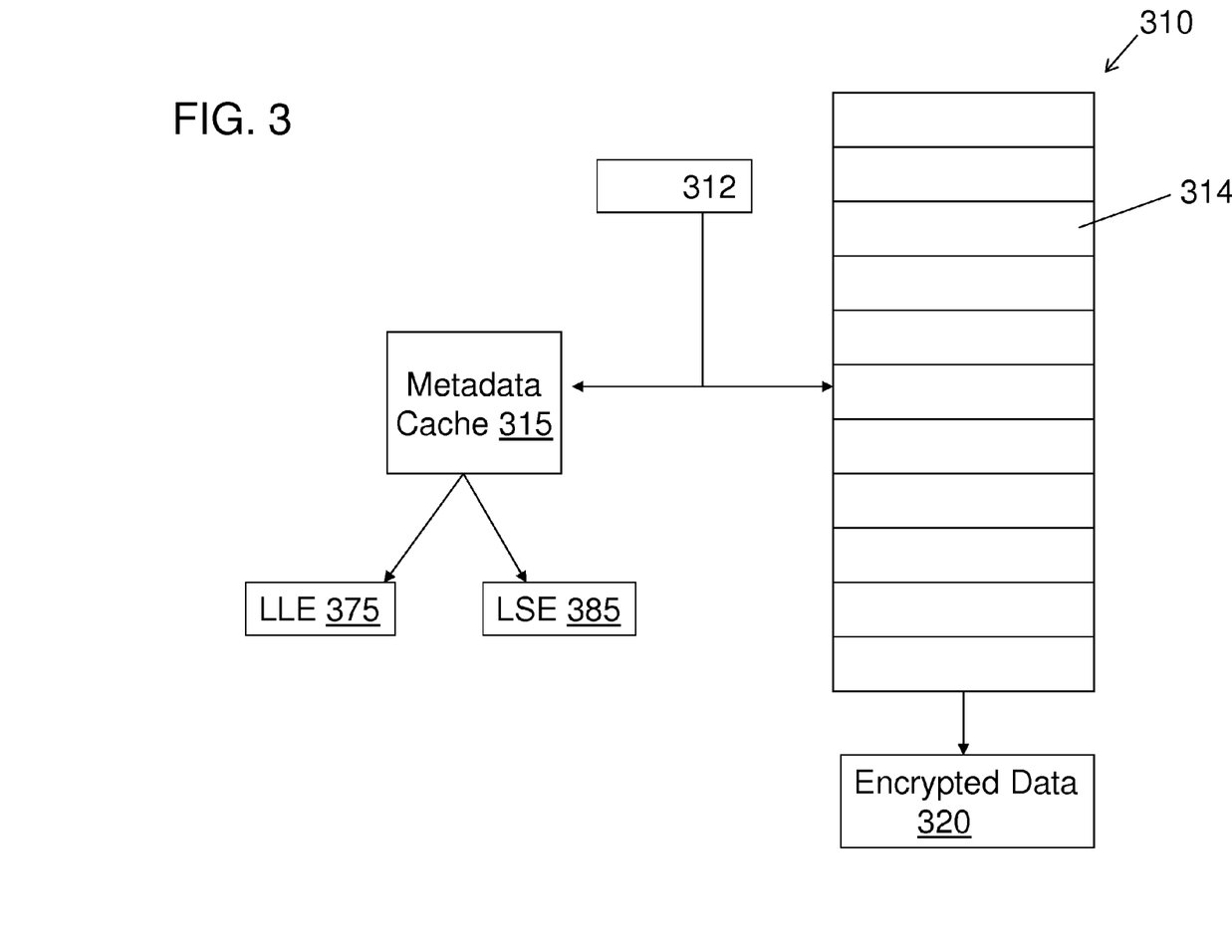
FIG. 3 depicts a block diagram illustrating a hybrid encryption organization architecture in accordance with one embodiment.

FIG. 3 provides the architecture of a hybrid encryption structure as per one embodiment that uses a plurality of encryption schemes. In this embodiment, the LSE and LLE schemes are used but with the understanding that, as can be appreciated by those skilled in the art, other methods can also be used in alternate embodiments.

In FIG. 3, the hybrid encryption structure is designed to achieve a balance between the advantages provided by the LLE and LSE while minimizing the shortcomings of each scheme. In this embodiment, the memory accesses and low storage is used for most of the lines in memory and a temporal locality such as a cache is used for storing most of the memory accesses as shown. LLE is used for the frequently used lines while LSE is used for the infrequently accessed ones. It should be noted that the definition of a "data-line" can be on the basis of logical or physical address.

In FIG. 3, the hybrid scheme is depicted having a memory 310 with a plurality of addresses 312 and memory lines 314 (also referred to herein as "data lines"). As shown in the embodiment of FIG. 3, a metadata cache 315 is provided that contains metadata entries for frequently accessed lines. Each entry is provided with a tag that identifies the line that owns that metadata. If an address (e.g., 312) is searched and is identified in the cache 315, a condition that is identified as a "hit" 370 in the Figure, then the memory line was encrypted using an LLE scheme. Consequently, the information being accessed has to be decrypted using an LLE scheme 375 as well. In one embodiment, this can be achieved by providing a low latency scheme such as metadata access that incurs low storage. For example an "ExOR" mask can be used or generated in a parallel sequence with providing the memory access. In this scenario, because only a portion of the cache 315 is used to provide the information, a small portion of memory is associated with the process completion. In one embodiment, LLE is used to encrypt the most frequently used lines (shown generally as encrypted data 320). This will allow for the average latency of encryption to be close to incidents where LLE is used alone, but with the advantages that another encryption scheme provides.

In order to keep track of the memory lines and their associated encryption scheme used (so that appropriate decryption scheme can also be used), a searching technique may be used, as shown in FIG. 3. Referring to FIG. 3, a "miss" in the metadata cache as shown at 380 means that the cache 315 does not include the information for an LLE cache associated with that memory. Therefore, the memory line was encrypted using an LSE, and LSE encryption 385 is used to decrypt it. Since only the most infrequently accessed lines are used with this scheme, the advantages associated with the hybrid scheme are close to those provided using a pure LSE method.

Figure 4:
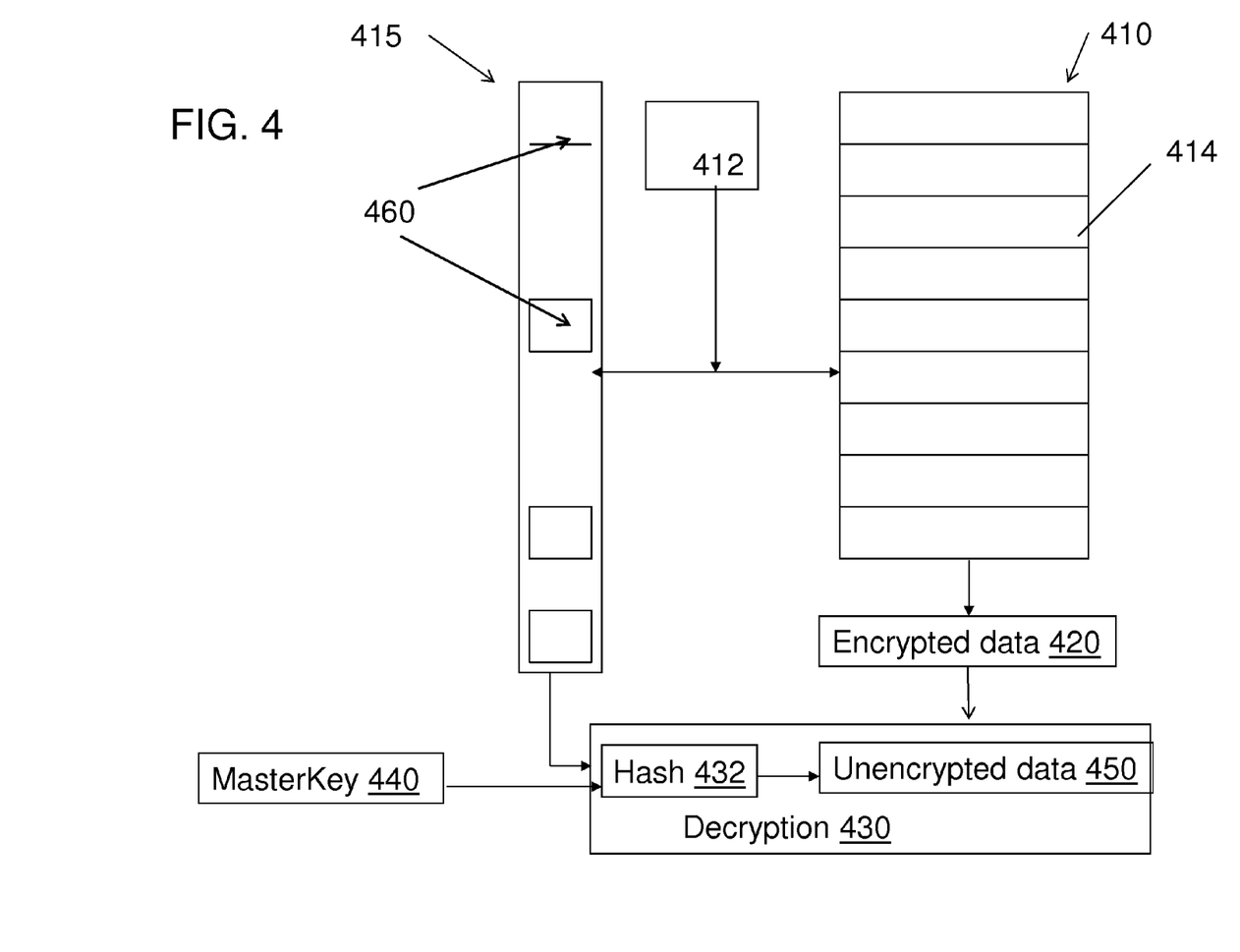
FIG. 4 depicts a block diagram of an exemplary embodiment illustrating hit access to a metadata cache in accordance with the embodiment of FIG. 3.
Figure 5:
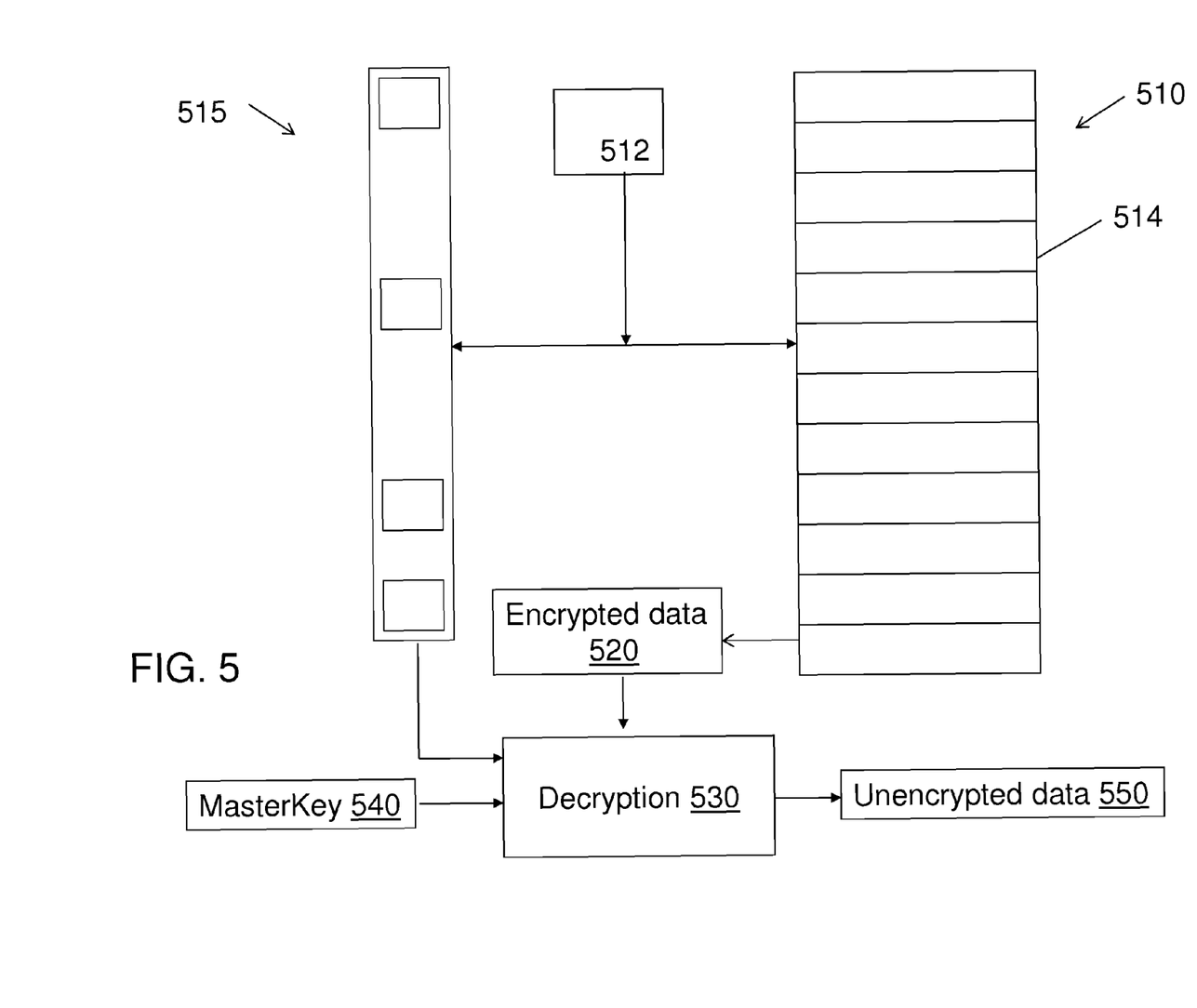
FIG. 5 depicts a block diagram of an exemplary embodiment illustrating missed access to a metadata cache in accordance with the embodiment of FIG. 3.

FIGS. 4 and 5 provide some of the concepts as discussed in conjunction with FIG. 3. In FIGS. 4 and 5, the schemes are depicted each having a memory 410 and 510, respectively, with a plurality of addresses 412 and 512, respectively, as well as memory lines 414 and 514, respectively (also referred to herein as "data lines"). In addition, data that has been encrypted is shown generally at 420 and 520 in respective FIGS. 4 and 5. In FIG. 4, a common case is shown where an address (e.g., 412) is identified in the cache 415. For ease of understanding, the cache 415 is provided as shown in FIG. 4 but the addresses provided are illustrated by the blocks 460 that appear in the cache and identified as 460. The size of the cache 415 is much smaller by comparison to that shown in FIG. 2 and is closer to the size of the cache shown in FIG. 1.

In FIG. 4, a master key 440 is used to decrypt 430 (e.g., through a hash function 432) the encrypted data 420 and further mask encrypted data 420 for added security. The decryption 430 yields the unencrypted data 450.

FIG. 5 illustrates the case where the memory address (e.g., 512) was not identified in the cache 515 so that the metadata does not exist. This case was previously identified in FIG. 3 as a "Miss" (380). This would be a more uncommon case as the frequency where the access misses the metadata cache 515 is not as high. A "Miss" indicates, in this embodiment, that the address 512 was encrypted using a slower encryption method such as LSE. As discussed, since the given address was not encrypted with LLE but rather was encrypted with LSE, the line therefore must also be decrypted with LSE. In FIG. 5, a master key 540 is used to decrypt 530 (e.g., through a hash function 532) the encrypted data 520 and further mask encrypted data 520 for added security. The decryption 530 yields the unencrypted data 550.

In one embodiment, a processor can evaluate the frequency of address use and determine when and if a memory access needs to be encrypted by one or the other method. When a memory line that is originally identified as a candidate for a LSE encryption suddenly is used more frequently, then the particular memory line is upgraded as a better candidate for using an LLE scheme. For such increase in frequency of access, the line is then updated and an appropriate metadata entry is constructed for the line in the metadata cache. Subsequently, the line is then encrypted using an LLE. In one embodiment, a number of entries into a cache can be closely monitored such that adding an entry into metadata cache can evict another entry. For such evicted lines, the encryption is changed from LLE to LSE and the appropriate process steps are followed. The update to LLE can be performed using various policies such as frequency, but others are also available as can be appreciated by those skilled in the art. Similarly, downgrading a line to be encrypted by an LSE can be orchestrated by using various replacement algorithms in the metadata cache as known to those skilled in the art.

In one embodiment, data in a main memory is monitored for frequency of access. A preselected frequency of access threshold can be set, in one embodiment, using a counter or many other techniques that are available as appreciated by those skilled in the art. In encrypting the data, exceeding frequency of access threshold can determine if a first encryption scheme can be used or a second encryption scheme can be used to encrypt the data. When a first method is used, encrypted data is then stored in a first memory such as a cache and when a second encryption method is used, the encrypted data is stored in a second memory. It should be noted that the first and the second memories are separate regions of the same memory, in one embodiment. However, in another embodiment, the first and second memories may exist in different memory devices.

Figure 6:
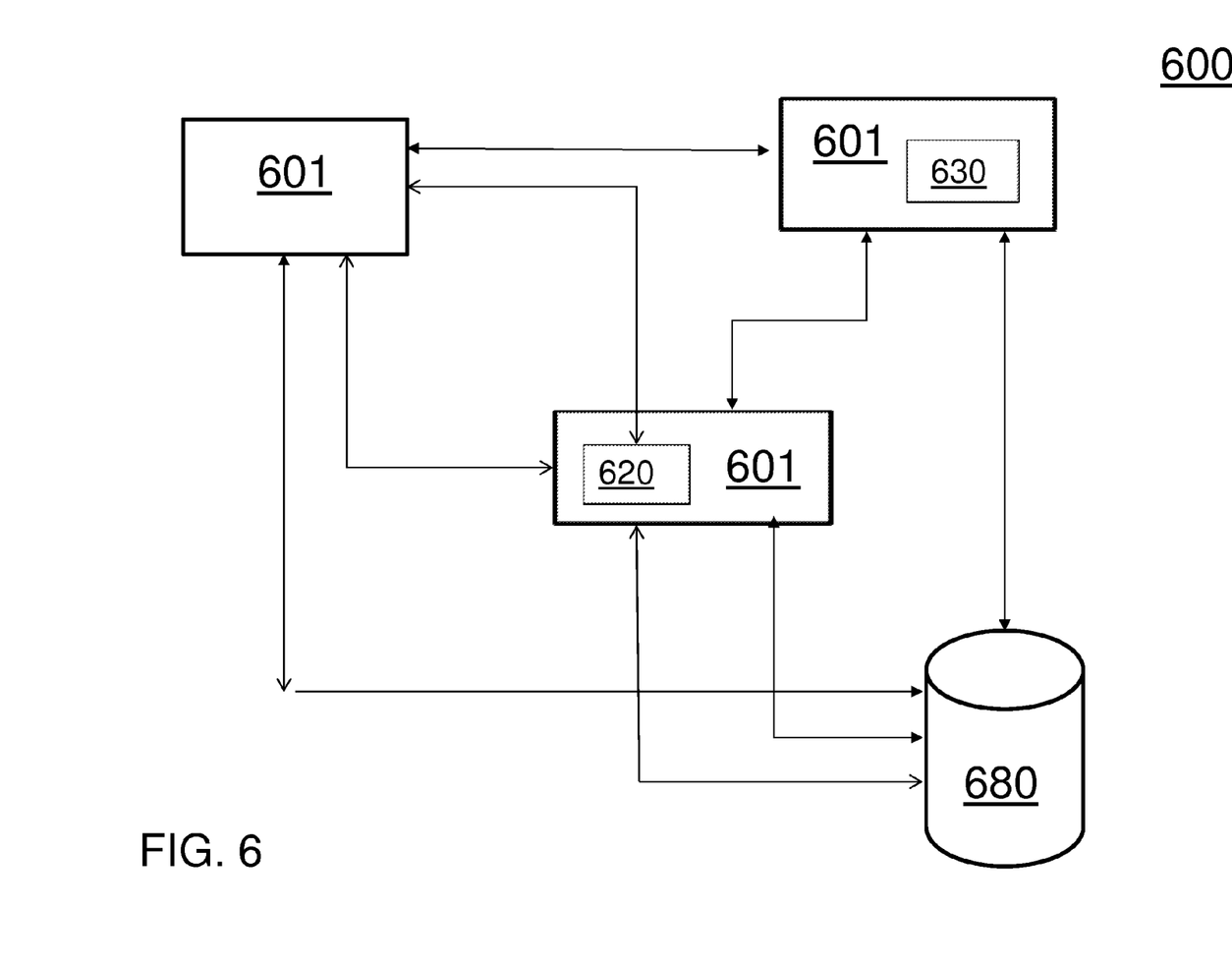
FIG. 6 depicts a block diagram of a computing environment that can be used in accordance with different embodiments.

FIG. 6 is a block diagram illustration of a computing environment for implementing the processes described herein. As illustrated in FIG. 6, a system 600 comprises a plurality of nodes 601 that are in processing communication with one another. This communication can be enabled through wired or wireless processing or other alternate means as can be appreciated by those skilled in the art. Each node 601 can also include one or more processors 630. Each node 601 can include its own internal memory as shown at 620, or be in processing communication with that node's internal memories, or in communication with one or more external memories such as the one shown in FIG. 6 at 680. The system memories 620 and 680 can also be in communication directly with one another or through the node and either be comprised of a single unit that is shared among the many nodes 601 or be comprised of a plurality of components that are in processing communication with one another. In this manner, each node 601 can either exclusively use a single memory or alternatively use multiple memories at the same time or at different times to achieve processing optimization.

In one embodiment, one or more nodes 601 or processors 630 can be used while in processing communication with one another one of the memories such as 620 or 680 to provide instructions for carrying out the techniques discussed above. The memory can have a set of instructions recorded thereon which can be carried out by the processor to perform the processes described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for encrypting a first memory having data lines in a computer system, comprising:
   identifying a plurality of the data lines that are determined to be frequently accessed;
   storing metadata for each of the plurality of data lines in a corresponding entry of a second memory, the metadata utilized in decrypting the data line;
   encrypting the plurality of the data lines determined to be frequently accessed using a first encryption scheme; and
   encrypting a plurality of the data lines that are determined not to be frequently accessed using a second encryption scheme, wherein the first encryption scheme is a low latency encryption (LLE) scheme and the second encryption scheme is a low storage encryption (LSE) scheme;
   wherein upon a change of identification of a data line encoded using the first encryption scheme occurring, the method includes removing the metadata corresponding to the data line from the second memory, and encrypting the data line using the second encryption scheme.

2. The method of claim 1 wherein the identifying is performed responsive to at least one of:
   determining a recency of access;
   estimating a frequency of access; and
   estimating a probability of access.

3. The method of claim 1, wherein the plurality of the data lines determined to be frequently accessed changes during operation of the computer system.

4. The method of claim 3, wherein changes occur based on at least one of:
   a recency of access;
   an estimate of a frequency of access; and
   an estimate of a probability of access.

5. The method of claim 1, wherein the metadata is computed responsive to at least one of:
an address of the data line in the first memory;
an access counter for the data line in the first memory; and
a global access counter of the first memory.

6. The method of claim 1, wherein upon a change of identification of a data line encoded using the second encryption scheme occurring, the method includes generating metadata corresponding to the data line, storing the metadata in the second memory, and encrypting the data line using the first encryption scheme.

7. The method of claim 1, wherein when the data line is written to using the first encryption method, the method includes writing metadata corresponding to the data line to the second memory.

8. The method of claim 1, wherein the first memory and the second memory are separate regions of a single memory device.

9. The method of claim 1, wherein the first memory and the second memory are in different memory devices.

10. The method of claim 1, wherein the second memory is a cache memory device.

11. The method of claim 1, wherein data encrypted with different encryption schemes are stored and coexist in a main memory.

12. The method of claim 1, wherein the first encryption scheme expands data to be stored by an amount larger than the second encryption scheme.

13. The method of claim 1, wherein each of the first encryption scheme and the second encryption scheme has an associated quantity of metadata.

14. The method of claim 1, wherein stored data and associated metadata are retrieved before decryption of the data using either of the first encryption scheme and the second encryption scheme.

15. The method of claim 1, further comprising decrypting stored data, the decrypting comprising:
upon receiving data, searching in the first memory for a match between the data and information previously stored in the first memory to decrypt the data;
decrypting the data using a first encryption scheme upon determining the match exists between the data and the information in response to the searching in the first memory;
searching in the second memory upon determining that there is no match between the data and the information in response to the searching in the first memory; and
using a second decryption scheme when the data corresponds to an entry using the second memory.

16. A computer program product for encrypting data, the computer program product comprising a computer readable storage medium having computer readable program code embodied therewith, the computer readable program code being executable by a computer to:
identifying a plurality of the data lines that are determined to be frequently accessed;
storing metadata for each of the plurality of data lines in a corresponding entry of a second memory, the metadata utilized in decrypting the data line;
encrypting the plurality of the data lines determined to be frequently accessed using a first encryption scheme; and
encrypting a plurality of the data lines that are determined not to be frequently accessed using a second encryption scheme, wherein the first encryption scheme is a low latency encryption (LLE) scheme and the second encryption scheme is a low storage encryption (LSE) scheme;
wherein upon a change of identification of a data line encoded using the first encryption scheme occurring, the method includes removing the metadata corresponding to the data line from the second memory, and encrypting the data line using the second encryption scheme.

17. A computer system for encryption of data, the computer system comprising:
a main memory for storing data into a plurality of associated addresses; and
a processor communicatively coupled to the main memory, the processor configured to:
identify a plurality of the data lines that are determined to be frequently accessed;
store metadata for each of the plurality of data lines in a corresponding entry of a second memory, the metadata utilized in decrypting the data line;
encrypt the plurality of the data lines determined to be frequently accessed using a first encryption scheme; and
encrypt a plurality of the data lines that are determined not to be frequently accessed using a second encryption scheme, wherein the first encryption scheme is a low latency encryption (LLE) scheme and the second encryption scheme is a low storage encryption (LSE) scheme;
wherein upon a change of identification of a data line encoded using the first encryption scheme occurring, the processor is configured to remove the metadata corresponding to the data line from the second memory, and encrypt the data line using the second encryption scheme.

18. The computer system of claim 17, wherein upon a change of identification of a data line encoded using the second encryption scheme occurring, the processor is configured to generate metadata corresponding to the data line, store the metadata in the second memory, and encrypt the data line using the first encryption scheme.

19. The computer program product of claim 16, wherein upon a change of identification of a data line encoded using the second encryption scheme occurring, the computer readable program code is configured to generate metadata corresponding to the data line, store the metadata in the second memory, and encrypt the data line using the first encryption scheme.

* * * * *